US010309475B2

(12) United States Patent
Duvall

(10) Patent No.: US 10,309,475 B2
(45) Date of Patent: Jun. 4, 2019

(54) ELEVATOR BRAKE PAD MOUNTING SYSTEMS AND METHODS FOR MAKING AND USING SAME

(71) Applicants: THYSSENKRUPP ELEVATOR AG, Essen (DE); THYSSENKRUPP AG, Essen (DE)

(72) Inventor: Jeffrey Duvall, Woodstock, GA (US)

(73) Assignees: THYSSENKRUPP ELEVATOR AG, Essen (DE); THYSSENKRUPP AG, Essen (DE)

( * ) Notice: Subject to any disclaimer, the term of this patent is extended or adjusted under 35 U.S.C. 154(b) by 112 days.

(21) Appl. No.: 15/450,248

(22) Filed: Mar. 6, 2017

(65) Prior Publication Data

US 2018/0252285 A1 Sep. 6, 2018

(51) Int. Cl.
*F16D 69/04* (2006.01)
*F16D 65/06* (2006.01)
*B66B 5/22* (2006.01)

(52) U.S. Cl.
CPC ........... *F16D 69/0408* (2013.01); *B66B 5/22* (2013.01); *F16D 65/06* (2013.01); *F16D 2069/0433* (2013.01); *F16D 2069/0441* (2013.01)

(58) Field of Classification Search
CPC ............. F16D 69/0408; F16D 65/06; F16D 2069/0433; F16D 2069/0441; B66B 5/22
See application file for complete search history.

(56) References Cited

U.S. PATENT DOCUMENTS

| 455,033 A | * | 6/1891 | Criswell | F16D 65/092 188/244 |
| 4,350,231 A | * | 9/1982 | Crossman | F16D 65/092 188/218 XL |
| 4,819,765 A | * | 4/1989 | Winkler | B66B 5/22 187/376 |
| 5,096,020 A | * | 3/1992 | Korhonen | B66B 5/22 187/359 |
| 5,363,942 A | * | 11/1994 | Osada | B66B 5/22 187/376 |

(Continued)

FOREIGN PATENT DOCUMENTS

| CN | 102219140 A | 10/2011 |
| JP | 2011-78901 | * 10/2011 |

OTHER PUBLICATIONS

Linear Flat Needle Roller Bearings, GOST designation (Minsk Bearing Plant designation): RIP 2025KK (FF 2025ZW) RIP 3020K (FF 3020), http://www.minprom.gov.by/eng/fair_products?page=0 &ItemID=6725&SubSection_ID=1.03.03.

*Primary Examiner* — Michael A Riegelman
(74) *Attorney, Agent, or Firm* — Lathrop Gage L.L.P.

(57) ABSTRACT

An elevator braking system comprises a wedge having a brake pad attachment section. The brake pad attachment section has a recessed brake pad receiving portion and a recessed side plate receiving portion. The system includes a brake pad having a notch. The brake pad is configured to be received within the recessed brake pad receiving portion. The system comprises a side plate having a fastener receiving portion and an overhanging portion that is perpendicular to the fastener receiving portion. The overhanging portion mates with the notch when the side plate is secured to the recessed side plate receiving portion.

19 Claims, 6 Drawing Sheets

(56) References Cited

U.S. PATENT DOCUMENTS

| | | | | |
|---|---|---|---|---|
| 5,469,942 A | * | 11/1995 | Krumm, Sr. | F16D 51/20 |
| | | | | 188/250 B |
| 5,636,717 A | * | 6/1997 | Cardenas | F16D 69/0416 |
| | | | | 188/250 D |
| 6,244,396 B1 | * | 6/2001 | Lumpkin | B62L 1/10 |
| | | | | 188/24.11 |
| 6,997,287 B2 | * | 2/2006 | Sasaki | B66B 5/22 |
| | | | | 187/372 |
| 7,044,416 B2 | * | 5/2006 | Salvador | B21C 47/003 |
| | | | | 226/195 |
| 2008/0296098 A1 | * | 12/2008 | Sato | B66B 5/22 |
| | | | | 187/376 |
| 2012/0031718 A1 | * | 2/2012 | Arbesman | F16D 69/0408 |
| | | | | 188/251 R |
| 2016/0137456 A1 | * | 5/2016 | Duvall | B66B 5/18 |
| | | | | 187/359 |
| 2017/0129741 A1 | * | 5/2017 | Hu | F16D 59/02 |

* cited by examiner

ELEVATOR BRAKE PAD MOUNTING SYSTEMS AND METHODS FOR MAKING AND USING SAME

FIELD OF THE DISCLOSURE

The disclosure relates generally to the field of brake pad mounting systems. More specifically, the disclosure relates to elevator safety brake pad mounting systems.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to an embodiment, an elevator braking system comprises a wedge having a brake pad attachment section. The brake pad attachment section has a recessed brake pad receiving portion and a recessed side plate receiving portion. The system includes a brake pad having a notch. The brake pad is configured to be received within the recessed brake pad receiving portion. The system comprises a side plate having a fastener receiving portion and an overhanging portion that is perpendicular to the fastener receiving portion. The overhanging portion mates with the notch when the side plate is secured to the recessed side plate receiving portion.

According to another embodiment, a method for coupling a brake pad to a wedge comprises the step of providing an elevator braking system. The system includes a wedge having a front surface and a side surface, a brake pad, and a side plate. The side plate has a fastener receiving portion and an overhanging portion that is perpendicular to the fastener receiving portion. The method includes the step of forming a recessed brake pad receiving portion in the front surface and a recessed side plate receiving portion in the side surface. The method comprises the step of forming a notch in the brake pad, and the step of situating the brake pad in the recessed brake pad receiving portion. The method further includes the step of securing the side plate to the recessed side plate receiving portion such that the overhanging portion mates with the notch to clamp the brake pad to the wedge.

According to yet another embodiment, an elevator braking system comprises a wedge, a brake pad, and a side plate. The wedge has a front face and a side face. The front face includes a brake pad receiving portion. The side face includes a side plate receiving portion. The brake pad has a notch and is situated in the brake pad receiving portion. The side plate is configured to be secured within the side plate receiving portion such that a part of the side plate mates with the notch.

Even if the subclaims merely refer to a single claim, every subclaim can refer to any other subclaim. The features and advantages described with reference to the method are applicable to the inventive elevator braking system. The features and advantages described with reference to the elevator braking system method are applicable to the inventive method.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

A conventional elevator system includes one or more elevator cars which travel vertically along guiderails in an elevator hoistway. The elevator system often includes safety gear to manage elevator operation during abnormal conditions. The safety gear may include a braking mechanism that is activated, e.g., by an overspeed governor, when the elevator car travels at an excessive speed that is faster than a recommended maximum speed associated with the elevator car. The traveling of an elevator car at such excessive speeds may be attributable to one or more of several conditions. A fault of or failure in the elevator controller, for example, may cause the elevator car to travel faster than its recommend maximum speed. Or, for instance, the elevator may travel at an excessive speed where the elevator cable breaks, resulting in elevator free fall. In such situations, the safety braking mechanism is automatically activated to cause the elevator car to decelerate in a desired manner. The safety braking mechanism may cause the elevator car to decelerate by employing friction or brake pads that selectively interact with the elevator guiderail.

Figure 1:
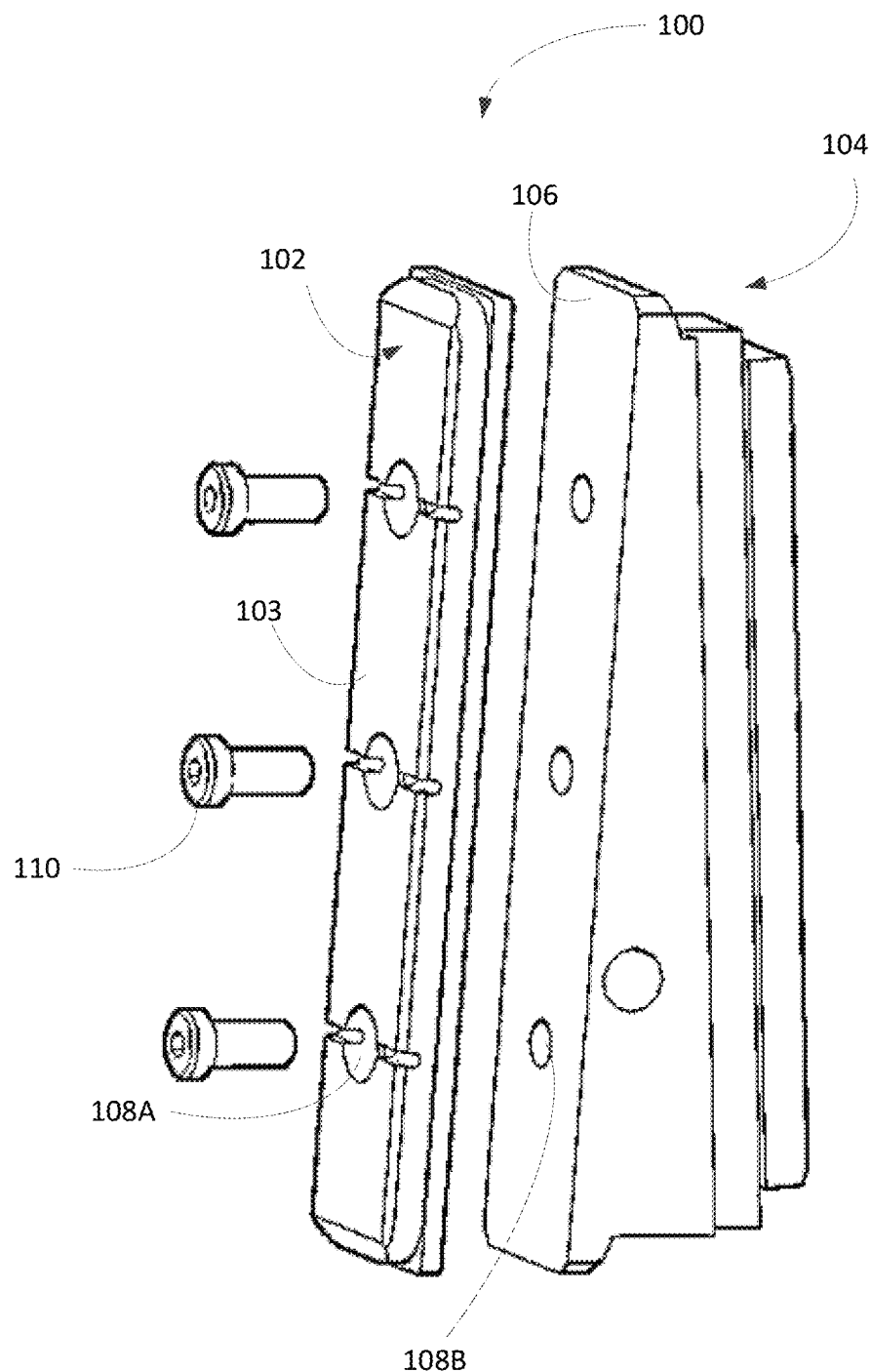
FIG. 1 is a perspective view of a PRIOR ART elevator brake pad mounting system.

FIG. 1 shows a typical safety brake pad mounting system 100 for an elevator, as is known in the art. The prior art elevator brake pad mounting system 100 includes a brake pad 102 having a braking face 103 and a wedge 104 having a wedge face 106. The brake pad 102 has apertures 108A, and the wedge 104 has apertures 108B that correspond to the apertures 108A. The brake pad 102 is attached to the wedge 104 via fasteners 110 that extend through the brake pad face 103 and the wedge face 106 (i.e., extend through the apertures 108A in the brake pad 102 and the apertures 108B in the wedge 104). Adhesive may also be provided between the back of the brake pad 102 and the wedge face 106. During the braking operation, one brake pad mounting system 100 disposed at one side of the guiderail and another brake pad mounting system 100 disposed at another side of the guiderail sandwich the guiderail such that the brake pads 102 forcefully contact the guiderail. The elevator decelerates due to the friction resulting from the interaction of the brake pads 102 with the guiderail.

Because failure of the brake pads 102 may result in injury and/or loss of life, it is of paramount importance that the brake pads 102 function as intended when called upon.

However, finding suitable elevator brake pads, particularly for tall buildings (e.g., buildings having fifteen or more floors), is a difficult endeavor. The brake pads 102 experience high thermal shock, high mechanical impact loads, and high compressive and shear loads, all of which impact the life of the brake pad 102. Brake pad longevity is also adversely affected because of the suboptimal industry standard method for coupling the brake pad 102 to the wedge 104. Specifically, the apertures 108A that are included in the brake pad face 103 to allow the fasteners 110 to couple the brake pad 102 to the wedge 104 are weak spots that introduce undue stress in the pad 102, and consequently, render the pad 102 more prone to cracking and failure. Further, the apertures 108A that extend through the brake pad 102 undesirably reduce the surface area of the brake pad 102 that can contact the guiderail for the braking operation. Moreover, in many elevator brake pad mounting systems, servicing or replacement of the brake pad 102 necessitates that the wedge 104 also be removed, e.g., from a clamp, which is inefficient. The present disclosure relates to a novel elevator brake pad mounting system that may, among other things, allow for brake pads to be removed from the wedge while the wedge remains coupled to other associated components of the system. The disclosed system may further allow for use of brake pads that are devoid of apertures, as the brake pads may be operably coupled to the wedge without fasteners that extend through the brake pad surface.

Figure 2A:
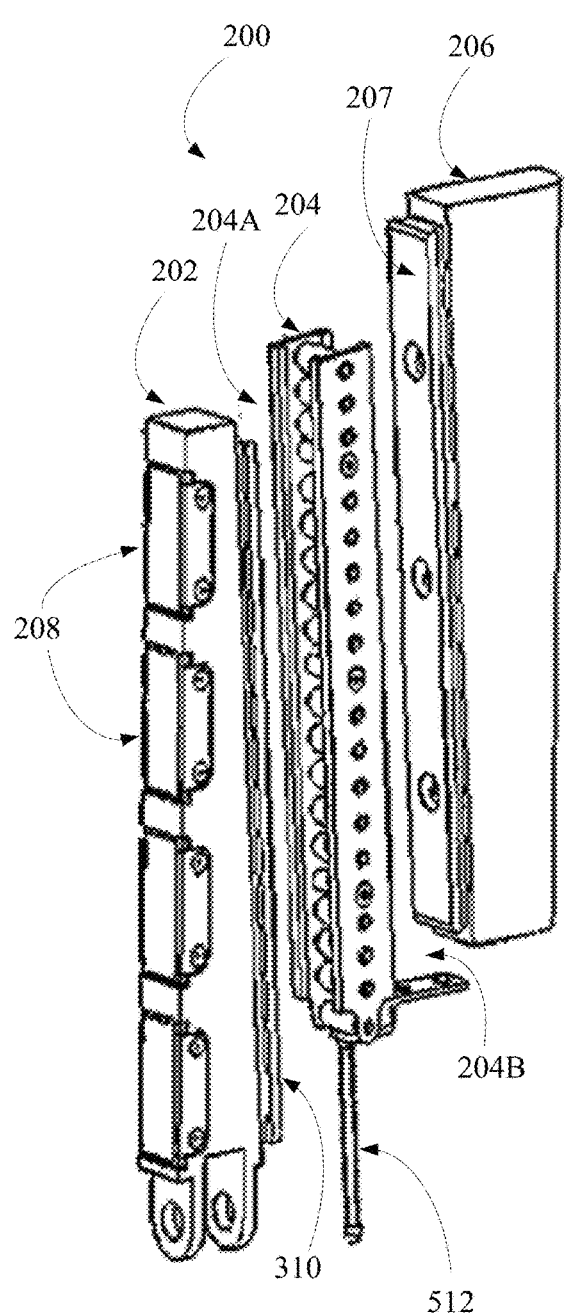
FIG. 2A is an exploded view of an elevator brake pad mounting system, according to an example embodiment of the present disclosure.
Figure 2B:
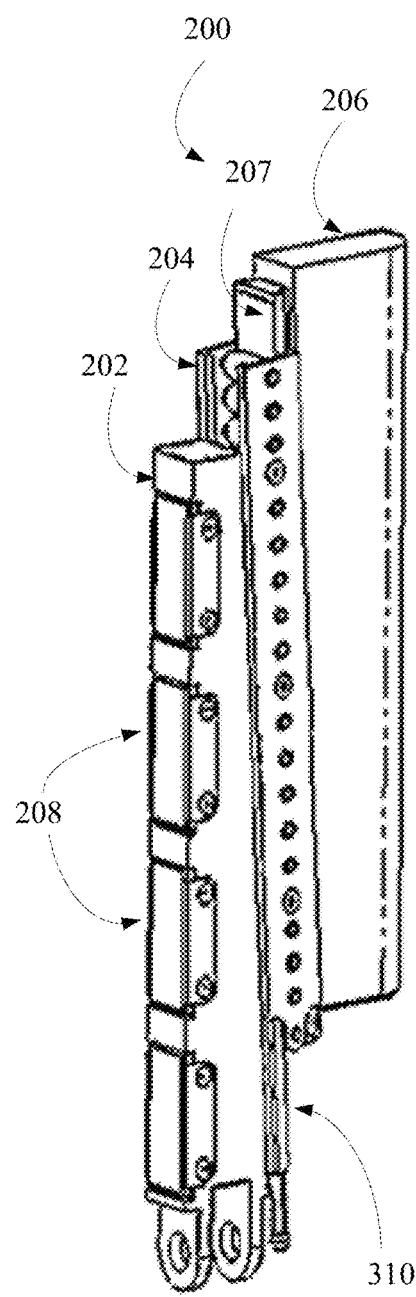
FIG. 2B is a perspective view of the elevator brake pad mounting system of FIG. 2A.

Focus is directed now to FIGS. 2A and 2B, which illustrate an elevator brake pad mounting system (or an elevator braking system) 200 according to an example embodiment. FIG. 2A shows an exploded view of the elevator brake pad mounting system 200, and FIG. 2B shows the system 200 in an assembled configuration. The brake pad mounting system 200, in an embodiment, may include a wedge 202, a roller bearing 204, and a clamping jaw 206. Brake pads 208 may be operably secured to the wedge 202, as discussed herein. The artisan will understand that the braking operation may be effectuated by the collective interaction of the brake pads 208 of two brake pad mounting systems 200 with the elevator guiderail.

Figure 3:
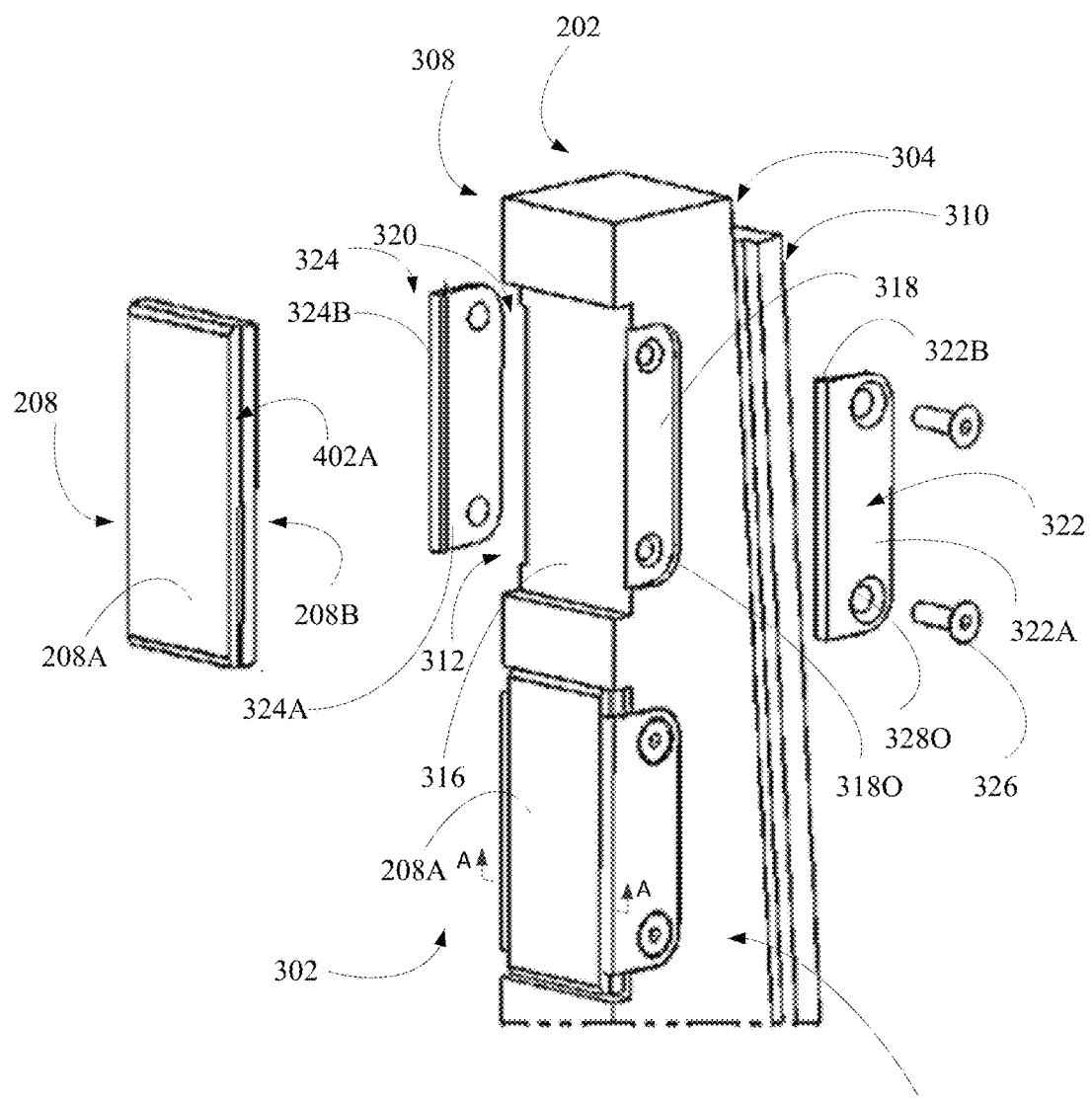
FIG. 3 is a perspective view of a wedge of the elevator brake pad mounting system of FIG. 2B illustrating the attachment of a brake pad to the wedge.

FIG. 3 shows a portion of the wedge 202 in additional detail. The wedge 202 may have a front face 302, a rear face 304, a first side face 306, and a second side face 308. The front face 302 and the first side face 306 of the wedge 202 may generally oppose the rear face 304 and the second side face 308, respectively. The rear face 304 of the wedge 202 may have secured thereto a wedge bearing race 310, which may allow the wedge 202 to be operably coupled to the roller bearing 204 (FIGS. 2A-2B). The front face 302, the first side face 306, and the second side face 308 may collectively include one or more brake pad attachment sections 312, and each attachment section 312 may allow for the securement of one brake pad 208 to the wedge 202.

In more detail, the brake pad attachment section 312 may include a recessed brake pad receiving portion 316 formed in the wedge front face 302. The brake pad attachment part 312 may also include a first recessed side plate receiving portion 318 and a second recessed side plate receiving portion 320 that are respectively formed in the first side face 306 and the second side face 308 of the wedge 202. The first recessed side plate receiving portion 318 may oppose the second recessed side plate receiving portion 320 and be generally identical thereto. The first recessed side plate receiving portion 318 and the second recessed side plate receiving portion 320 may each include one or more openings (see, e.g., openings 318O in the first recessed side plate receiving portion 318) to allow for first and second side plates 322 and 324 to be respectively secured via fasteners (e.g., fasteners 326) to the first recessed side plate receiving portion 318 and the second recessed side plate receiving portion 320.

The first side plate 322 may be generally identical to the second side plate 324. The first and the second side plates 322 and 324 may each include one or more openings 328O. When the first side plate 322 is configured within the first recessed side plate receiving portion 318 of the wedge 202, the opening(s) 328O in the first side plate 322 may correspond to the opening(s) 318O in the first recessed side plate receiving portion 318. Similarly, when the second side plate 324 is configured within the second recessed side plate receiving portion 320 of the wedge 202, the opening(s) 328O in the second side plate 324 may correspond to the openings in the second recessed side plate receiving portion 320. The fastener 326 may be passed sequentially through the openings in the side plate and the corresponding opening in the recessed side plate receiving portion (e.g., through the opening 328O in the first side plate 322 and the corresponding opening 318O in the first recessed side plate receiving portion 318) to secure the side plate to the wedge 202.

The first side plate 322 may include a first portion 322A, which may also be referred to herein as the fastener receiving portion 322A. The openings 328O may be provided in the first portion 322A of the first side plate 322. The first side plate 322 may also include a second (or a protruding or overhanging) portion 322B that may extend from the first portion 322A and be generally perpendicular to the first portion 322A. A width of the fastener receiving portion 322A may be greater than a width of the protruding portion 322B. The second side plate 324 may likewise include a first (or a fastener receiving) portion 324A having the fastener receiving openings 328O, and a second (or protruding or overhanging) portion 324B that extends from the first portion 324A and is generally perpendicular thereto.

Figure 4:
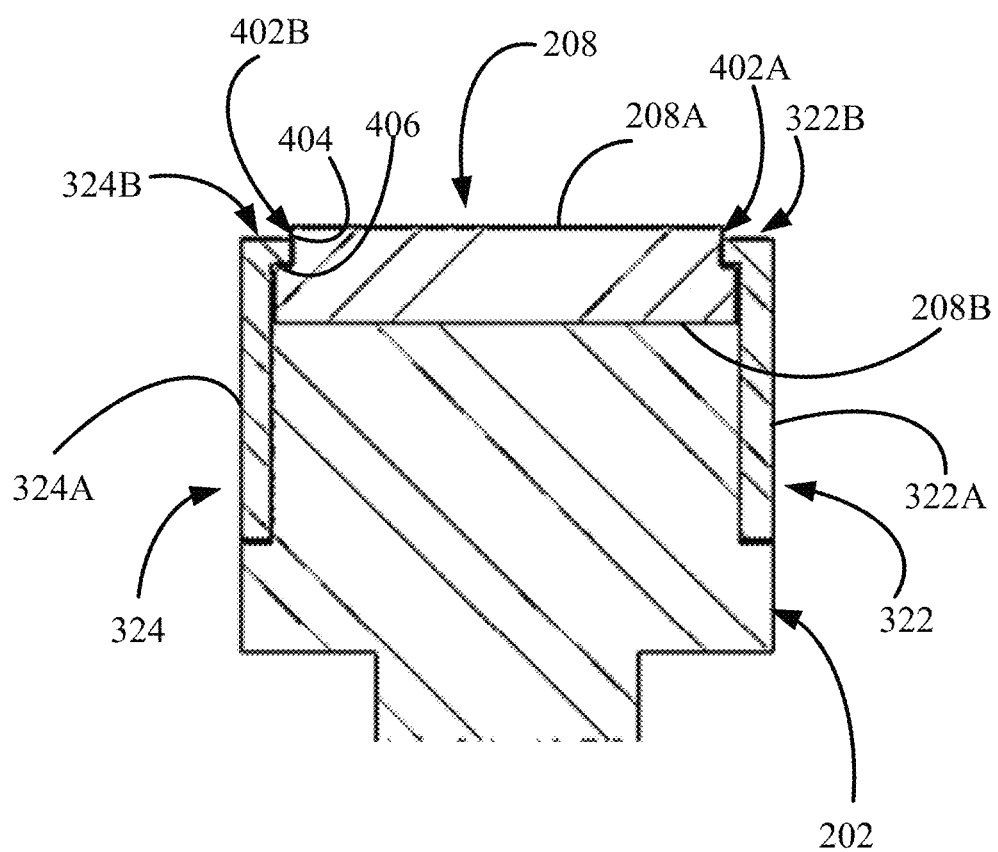
FIG. 4 is a cross section taken along line A-A in FIG. 3.

Focus is directed now to FIG. 4, which shows a cross-sectional view along line A-A in FIG. 3 to illustrate the securement of the brake pad 208 to the wedge 202, and specifically, to the brake pad attachment section 312 (FIG. 3) thereof. The brake pad 208 may be of unitary construction, and in embodiments, may include a front (or braking) face 208A and a back face 208B (see FIGS. 3, 4) that opposes the front face 208A. The brake pad front face 208A may include a notch or groove on either side thereof that extends generally vertically along the front face 208A such that a width of the brake pad back face 208B is greater than a width of the brake pad front face 208A. For example, the brake pad 208 may include a first notch 402A (FIGS. 3, 4) and a second notch 402B (FIG. 4) that each extend generally vertically at opposite sides of the brake pad front face 208A. In embodiments, the notches 402A and 402B may be generally identical and include, for example, a first wall 404 and a second wall 406. The notch first wall 404 may extend from and be generally perpendicular to the braking face 208A. The notch second wall 406 may extend from the notch first wall 404 and be generally perpendicular to the first wall 404. The brake pad notches 402A, 402B, and the side plates overhanging portions 322B, 324B, may collectively allow the brake pad 208 to be operably coupled to the wedge 202 without any fasteners that extend through the brake pad 208.

Specifically, and as can be seen in FIG. 4, when the brake pad 208 is operably coupled to the wedge 202 via the first and the second side plates 322 and 324, the overhanging portions 322B and 324B of the first and second side plates 322, 324 may correspond to and mate with the notches 402A and 402B, respectively. The brake pad 208 may thus be clamped in place in the brake pad receiving portion 316 (see FIG. 3) by the first and second side plates 322 and 324, respectively, and specifically, the overhanging portions 322B and 324B thereof. As can be appreciated from FIG. 4, the dimensions of the first and second notches 402A, 402B of the pad 208 may be configured such that the side plate overhanging portions 322B and 324B are at some distance away from the guiderail when the pad braking face 208A is in contact with the guiderail. That is, the notch first wall 404 (and thus the pad braking face 208A) may extend beyond the side plate overhanging portion (e.g., overhanging portion 322B and 324B) when the overhanging portion clamps the pad 208 to the wedge 202.

In this way, the pad 208 may be operably secured to the wedge 202 without the need for fasteners that extend through (e.g., extend through the braking face of) the brake pad, as in the prior art. Disadvantages of the prior art securing method (e.g., loss in surface area of the pad due to the fasteners that extend through the braking face of the pad, stress concentrations in the pad body that increase the chance of pad cracks, failure, etc.) may therefore be eliminated or at least greatly reduced. Securement of the pad 208 to the wedge 202 in line with the disclosure herein may also allow the shear force on the pad 208 to be more effectively transferred to the wedge 202 as compared to the prior art. Moreover, use of the side clamping plates 322 and 324 (as opposed to fasteners that extend through the pad) may allow maintenance personnel to repair or replace the pad 208 without the need to remove the wedge 202 or the associated roller bearings 204. In a currently preferred embodiment, no adhesive is employed to secure the pads 208 to the wedge 202.

In the prior art, the brake pads (e.g., brake pad 102) may be tightly secured to the wedge (e.g., wedge 104). As such, movement in the brake pad (e.g., where the brake pad increases in size due to thermal expansion during braking operation) may cause undue stress on the brake pad and result in premature wear. In accordance with the present disclosure, the side plates 322 and 324 may be operably coupled to the wedge 202 so as to allow for some play between the brake pad 208 and the wedge 202. Chances of pad failure and/or premature wear of the brake pad due to pad movement (e.g., because of thermal expansion) may therefore be diminished. Further, use of side plates 322 and 324 to secure the pad 208 to the wedge 202 as disclosed herein may allow for use of brake pads (e.g., brake pads 208) whose coefficient of thermal expansion is different from that of the wedge 202. The brake pad 208 may hence be made of any suitable materials, and be, for example, a ceramic matrix composite pad, a carbon metallic pad, a ceramic metallic pad, a sintered pad, a monolithic ceramic pad, a metallic pad, etc.

Figure 5:
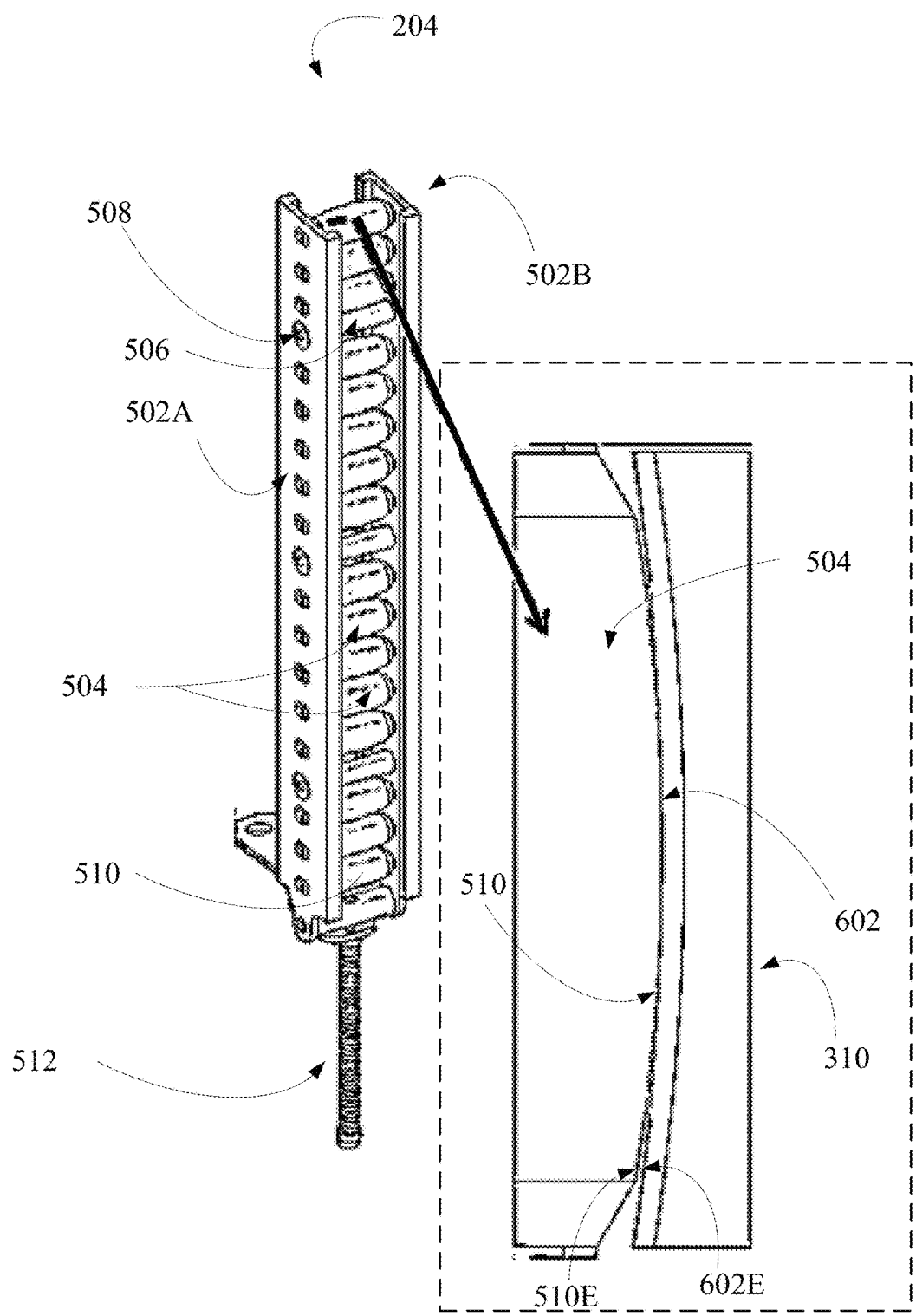
FIG. 5 is a perspective view of a roller bearing of the elevator brake pad mounting system of FIG. 2B.

Attention is directed to FIG. 5, which shows the example roller bearing 204 (FIG. 2) in more detail. The roller bearing 204 may have two opposing cages 502A and 502B. A plurality of rollers 504 may be rotatably coupled to the cages 502A and 502B. In some embodiments, the cages 502A, 502B may be coupled to each other with spacers 506 that extend laterally from one cage 502A to the other cage 502B. The spacers 506 may ensure that the cages 502A and 502B are properly aligned such that the rollers 504 can rotate freely therein. In some embodiments, fasteners 508 may be used to couple the cages 502A, 502B to the spacers 506. The fasteners 508 may allow the cage 502A to be conveniently decoupled from the cage 502B to, e.g., replace one or more of the rollers 504. In an example embodiment, and as discussed in more detail herein, each roller 504 may have an outer surface 510 that is curved. Specifically, the outer surface 510 of each roller 504 may be convex or generally convex.

As noted above, the wedge 202 has a bearing race 310 (see FIG. 3) that is coupled to rear face 304 of the wedge 202. The wedge bearing race 310 may allow the wedge 202 to be operably coupled to a first side 204A (see FIG. 2A) of the roller bearing 204, as shown in FIG. 2B. The clamping jaw 206 may also include a clamping jaw bearing race 207 (FIGS. 2A-2B), which may allow the roller bearing 204 to be slidably coupled to the clamping jaw 206 at a second side 204B of the roller bearing. The cages 502A, 502B of the roller bearing 204 may slide up and down along the clamping jaw bearing race 207, as needed. The roller bearing 204 may be conveniently decoupled from the clamping jaw 206 by sliding the cages 502A, 502B all the way down along the clamping jaw bearing race 207.

While not required, in some embodiments, the roller bearing 204 may include a resetting spring 512 that extends below the cages 502A and 502B. The resetting spring 512 may serve to reset the position of the roller bearing 204 along the clamping jaw bearing race 207. Specifically, the downward travel of the roller bearing cages 502A, 502B along the clamping jaw bearing race 207 may cause the spring 512 to eventually contact a stop and contract; the spring 512 may thereafter return to its original shape, and in so doing, return the roller bearing 204 to its initial position.

Figure 6:
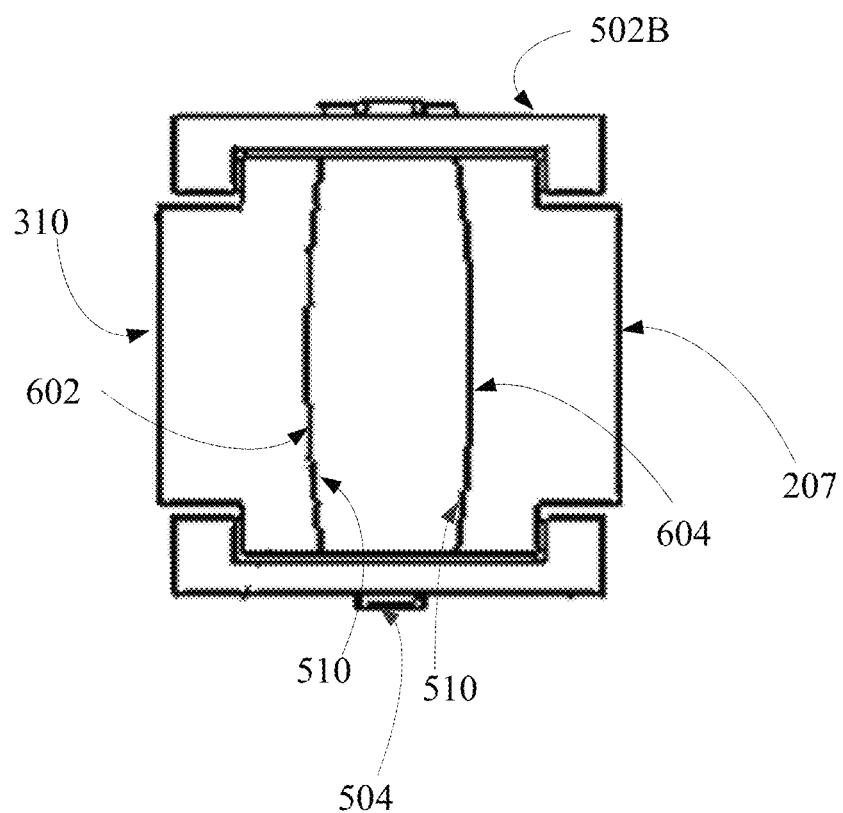
FIG. 6 is a top view of the roller bearing of FIG. 5 operably coupled to a bearing race of the wedge of FIG. 3 and a bearing race of a clamping jaw of FIG. 2.

FIG. 6 shows a top view of the roller bearing 204 coupled to the wedge bearing race 310 at one side and to the clamping jaw bearing race 207 at the other side. As can be seen, the wedge bearing race 310 may have an outer surface 602 that is curved. Specifically, the outer surface 602 of the wedge bearing race 310 may be concave or generally concave. The convex outer surface 510 of each roller 504 may be in contact with and largely correspond to the concave outer surface of the wedge bearing race 310. The curved (e.g., concave) outer surface 602 of the wedge bearing race 310 and the curved (e.g., convex) outer surface 510 of the roller 504 may collectively serve to automatically align the wedge 202 to the guiderail during the braking operation. More specifically, the generally corresponding curved surfaces 602 and 510 of the wedge bearing race 310 and the rollers 504, respectively, may allow the wedge bearing race 310 to pivot by small amounts to self-align the wedge 202 to the guiderail when the wedge 202 is moving with respect to the guiderail during a braking operation. This self-alignment during the braking operation may allow the brake pad 208 to contact the guiderail evenly for consistent pressure distribution within the brake pad 208. The curved surface 602 of the wedge bearing race 310 and the curved surface 510 of the roller 504 may thus collectively increase the useful life of the brake pad 208 as compared to brake pads of prior art brake mounting systems. In some embodiments, the bearing race 207 of the clamping jaw 206 may likewise include a curved (e.g., concave) surface 604 that generally corresponds to the curved (e.g., convex) surface 510 of the roller(s) 504.

In a currently preferred embodiment, the curvature of the curved outer surface 510 of the roller 504 may be such that the roller curved outer surface 510 only generally corresponds to—but does not perfectly mate with—the curved outer surface 602 of the wedge bearing race 310. More specifically, as shown in FIG. 5 on right, the curvature of the roller curved surface 510 and the wedge bearing race curved surface 602 may be such that a short distance (e.g., between 1 mm and 2 cm) is maintained between an end 510E of the roller curved surface 510 and a segment 602E of the bearing race curved surface 602 corresponding to the end 510E. Applicant's experiments show that such a small discrepancy between the curvatures of the curved outer surface 510 of the roller 504 and the curved outer surface 602 of the wedge bearing race 310 facilitates the self-alignment of the wedge bearing race 310 during the braking operation and results in relatively even brake pad loading. Conversely, where the curvature of the roller outer surface 510 corresponds perfectly with the curvature of the wedge bearing race curved outer surface 602, the brake pads 208 may exhibit uneven loading and/or excessive wear.

Thus, as has been described, the elevator braking system 200 may provide numerous benefits over prior art brake mounting systems. For example, the novel brake pad mounting technique and the self-aligning bearings employed in the system 200 may prolong brake pad useful life as compared to prior art systems. The brake pad mounting system 200 may further reduce the time and cost associated with maintenance of the braking system components, including of the brake pads 208 thereof. Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An elevator braking system, comprising:
a wedge having a brake pad attachment section; said section having a recessed brake pad receiving portion and a recessed side plate receiving portion;
a brake pad having a notch; said brake pad configured to be received within said recessed brake pad receiving portion; said notch disposed such that a back face of said brake pad is wider than a front face of said brake pad;
a wedge bearing race having a curved surface configured to self-align with a roller bearing during a braking operation; said wedge bearing race being coupled to said wedge; and
a side plate having a fastener receiving portion and an overhanging portion that is perpendicular to said fastener receiving portion; said side plate having a length shorter than an adjoining side of said brake pad;
wherein, said overhanging portion mates with said notch when said brake pad is received within said recessed brake pad receiving portion and said side plate is secured to said recessed side plate receiving portion.

2. The elevator braking system of claim 1, wherein said brake pad is devoid of an aperture that extends therethrough.

3. The elevator braking system of claim 1, wherein:
said notch comprises a first notch and a second notch; and
said side plate comprises a first side plate and a second side plate.

4. The elevator braking system of claim 1, further comprising said roller bearing having a roller.

5. The elevator braking system of claim 4, wherein said wedge bearing race has a concave outer surface and said roller has a convex outer surface.

6. The elevator braking system of claim 4, further comprising a clamping jaw; said clamping jaw having a jaw race to which the roller bearing is slidably coupled.

7. The elevator braking system of claim 4, further comprising a resetting spring; said resetting spring extending beneath a cage of said roller bearing.

8. The elevator braking system of claim 7, wherein said cage includes a first cage and a second cage; said first cage being coupled to said second cage with at least one spacer.

9. A method for coupling a brake pad to a wedge, comprising:
providing an elevator braking system, comprising:
said wedge having a front surface and a side surface;
said brake pad; and
a side plate having a fastener receiving portion and an overhanging portion that is perpendicular to said fastener receiving portion; said side plate having a length shorter than an adjoining side of said brake pad;
forming a recessed brake pad receiving portion in said front surface and a recessed side plate receiving portion in said side surface;
forming a notch in said brake pad such that a back face of said brake pad is wider than a front face of said brake pad;
situating said brake pad in said recessed brake pad receiving portion; and
securing said side plate to said recessed side plate receiving portion such that said overhanging portion mates with said notch to clamp said brake pad to said wedge.

10. The method of claim 9, further comprising the step of securing a wedge race to a rear surface of said wedge.

11. The method of claim 10, wherein said wedge race comprises a curved outer surface.

12. The method of claim 11, further comprising the step of slidably coupling a roller bearing to said wedge race.

13. The method of claim 11, further comprising the step of forming a roller bearing by rotatably coupling a roller to a cage of said roller bearing.

14. The method of claim 13, wherein said roller includes a curved outer surface.

15. The method of claim 14, further comprising the step of using said curved outer surface of said wedge race and said curved outer surface of said roller to automatically align said brake pad to a guiderail during a braking operation.

16. An elevator braking system, comprising:
a wedge having a front face and a side face; said front face including a brake pad receiving portion; said side face including a side plate receiving portion;
a brake pad having a notch; said notch disposed such that a back face of said brake pad is wider than a front face of said brake pad; said brake pad being situated in said brake pad receiving portion; and
a side plate configured to be secured within said side plate receiving portion such that a part of said side plate mates with said notch; said side plate having a length shorter than an adjoining side of said brake pad.

17. The elevator braking system of claim 16, wherein a coefficient of thermal expansion of a first material forming said brake pad is different from a coefficient of thermal expansion of a second material forming said wedge.

18. The elevator braking system of claim 16, wherein said side plate includes a fastener receiving portion and an overhanging portion perpendicular to said fastener receiving portion.

19. The elevator braking system of claim 16, further comprising a roller bearing slidably coupled to said wedge.

* * * * *